United States Patent
Patel

Patent Number: 5,511,370
Date of Patent: Apr. 30, 1996

[54] DOUBLE RAKE

[76] Inventor: Thakorbhai G. Patel, 10980 Rice Field Pl., Fairfax Station, Va. 22039

[21] Appl. No.: 233,316

[22] Filed: Apr. 26, 1994

[51] Int. Cl.⁶ ..................................................... A01D 7/06
[52] U.S. Cl. ................................ 56/400.16; 56/400.21
[58] Field of Search ................................ 56/400.16, 400.21; 7/114

[56] References Cited

U.S. PATENT DOCUMENTS

| | | | |
|---|---|---|---|
| 531,722 | 1/1895 | Hart | 56/400.17 |
| 3,332,223 | 7/1967 | Polisso | 56/400.17 |
| 4,150,528 | 4/1979 | Rendin | 56/400.19 |
| 4,667,458 | 5/1987 | Barrett | 56/400.16 |
| 5,099,638 | 3/1992 | Bass | 56/400.16 |
| 5,177,946 | 1/1993 | Dietz, Jr. | 56/400.16 |
| 5,249,413 | 10/1993 | McDonough, Jr. | 56/400.16 |

*Primary Examiner*—Terry Lee Melius
*Attorney, Agent, or Firm*—Gary Pisner

[57] ABSTRACT

An improved rake head consisting of multiple tines attached to a rake support member with each tine having two prongs. When the tines of the rake are flexed during use, both prongs on each tine make firm contact with the ground. The firm contact of each prong with the ground enhances raking efficiency.

11 Claims, 2 Drawing Sheets

DOUBLE RAKE

FIELD OF INVENTION

This invention relates to an improved rake with two tine ends per tine.

DESCRIPTION OF THE RELATED ART

The rake is an ancient tool. Throughout time people have attempted to improve the efficiency of the rake. One method of increasing the efficiency of a rake is to stagger the position of the end of the rake tines. One can see this approach in Polisso U.S. Pat. No. 3,332,223 (1967), King U.S. Pat. No. 4,744,208 (1988), and Bass U.S. Pat. No. 5,099,638 (1992). The staggering of the tine ends to create multiple rows of tine ends improves raking efficiency. This approach to increasing rake efficiency is serf limiting because the only way of increasing the efficiency of a rake with staggered tine ends is to increase the number of rows of tine ends (see Bass U.S. Pat. No. 5,099,638). Bass's rake invention has three rows of tine ends rather then the earlier two row design. If one increases the number of tine end rows to four, the rake becomes awkward to use.

SUMMARY OF THE PRESENT INVENTION

The present invention relates to a rake head for lawn and garden with two rows of tine ends.

This invention differs markedly from other multiple row related art described above. With the present invention, rather than staggering the tine ends to increase efficiency two tine ends per tine are used. There are a number of advantages with this approach.

First, one cannot increase the number of tines end rows beyond three without loosing raking efficiency. Also, when one increases the number of tine end rows, one must also increase the length of the tines and width of the rake. It is the object of the present invention to increase efficiency without the need for increasing the length of the tines and width of the rake head.

Second, the present invention unlike related art has a tine with a taper. This taper produces a more efficient flexure of the line, thus increasing the force of the tine ends against the ground.

Third, the present invention optimally positions the tine ends relative to the ground while raking.

Finally, given the increased use of plastic rakes, the plastic embodiment of the present invention is easy to manufacture.

DRAWING FIGURES

DESCRIPTION OF THE PREFERRED EMBODIMENT

Figure 1:
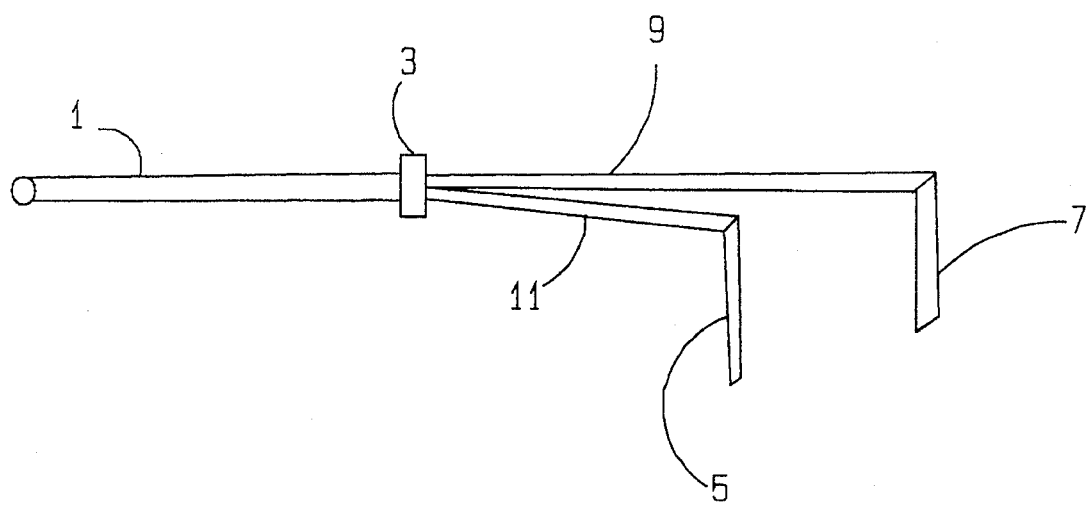
FIG. 1 shows one embodiment of the tineof the present invention.

FIG. 1 shows the construction of the tine in the double rake invention. The tine stem 1 is attached to the rake support member FIG. 2 17. The tine stem 1 can either be manufactured by fusing or welding two tines, binding two tines together with ferrules 3 and/or ribs (see FIG. 2 19), or for plastic embodiments of this invention, the proper tapering of the tine stem 1 can be accounted for in the mold. The preferred length for the tine stem 1 is 5 cm.

The tine has an upper leg 9 terminating in an upper leg end 7 and a lower leg 11 terminating in a lower leg end 5. The preferred length for the upper leg 9 is approximately 20 cm measured from the tine stem 1, the preferred length for the upper leg end 7 is 5 cm and the preferred angle between the upper leg 9 and the upper leg end 7 is approximately 90 degrees. For the lower leg 11, the preferred length measured from the tine stem 1 is approximately 7.5 cm, the preferred length of the lower leg end 5 is approximately 7.5 cm, and the inside angle between the lower leg 11 and the lower leg end 5 is 120 degrees.

Figure 2:
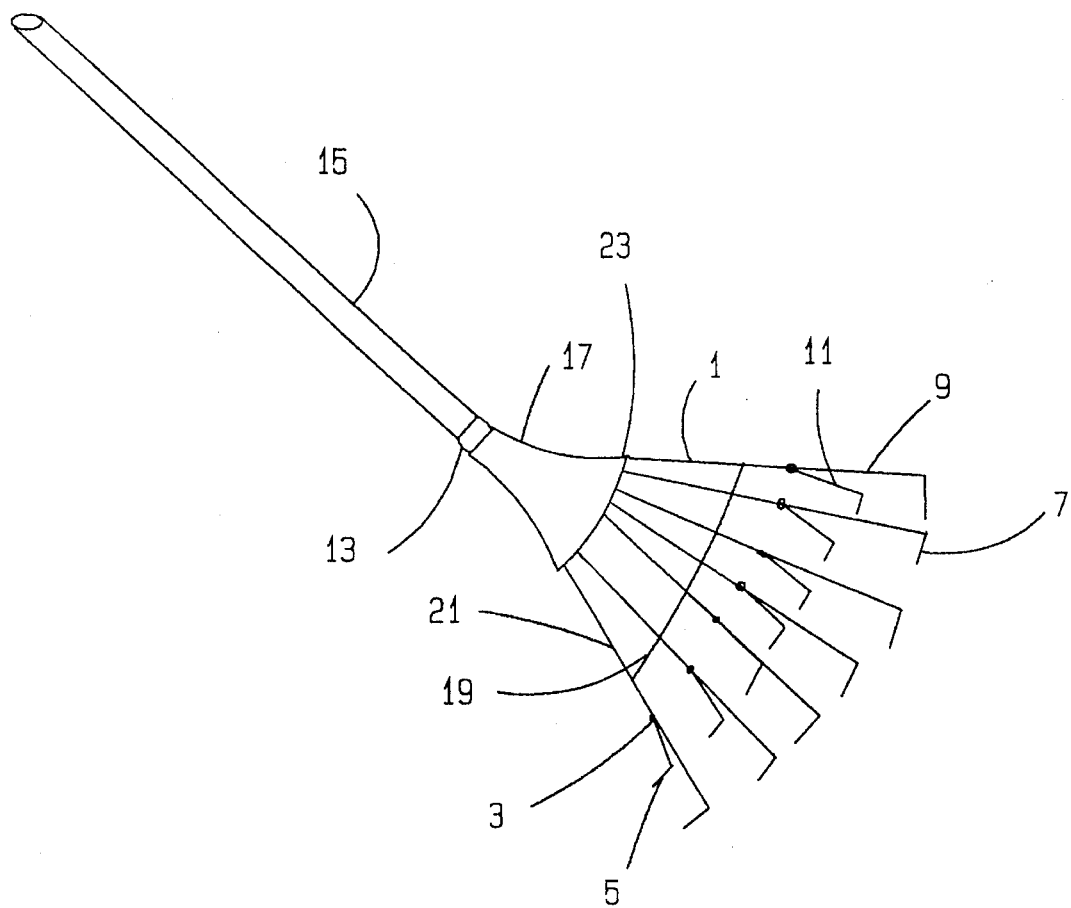
FIG. 2 shows a rake with the present invention's "double rake" rake head.

FIG. 2 shows the construction of the double rake. A handle 15 is attached to the rake support member 17 by a socket 13. The handle 15 can be made of a stiff material such as wood, fiberglass or metal. The composition of the handle 15 is not critical to the functioning of the present invention. A rake support member 17 holds each tine 21 at a given angle on a single plane or slightly curved surface. The tines 21 are either attached to the rake support member 17 by inserting the tine 21 through a crimpable loop integrated into the rake support member 17, by gluing the tine 21 to the rake support member 17 with an adhesive, by heat fusing or welding the tine 21 to the rake support member 17, or by creating the rake head 23 as a single molded unit. The preferred number of tines for the rake is 24.

The operation of the present invention entails holding the handle 15 in a manner that permits the upper leg ends 7 to touch the ground. Pressure is applied to the handle 15 in a manner that causes the tine 21 to flex until the lower leg ends 5 to touch the ground. One can then effectively sweep with the double rake.

Accordingly, the present invention has the advantage of producing greater raking efficiencies than conventional and staggered row rakes, with fewer tines 21, with a more compact rake head 23, and with lower overall cost of manufacture.

Although the above description contains many specificities, these specificities should not be construed as limiting the scope of the invention, but as merely providing illustrations of some of the presently preferred embodiments of this invention. For example, the preferred embodiment of the present invention would be made of polypropylene; however the present invention could also be made of metal.

Thus the scope of the invention should be determined by the appended claims and their legal equivalents, rather than by the examples given.

I claimed:

1. A rake head, comprising:
   a. a plurality of tine stems, each said tine stem including at least one upper leg tine segment terminating in an upper leg end and at least one lower leg tine segment terminating in a lower leg end; each said upper leg tine segment and said lower leg tine segment extending from each said tine stem from a common connection point;
   b. a rake support member that holds said plurality of tine stems at an angle on a single plane;
   c. a means for connecting each said upper and lower leg tine segments to said tine stems at said common connection point;
   d. a means for attaching said plurality of tine stems to said rake support member;
   e. a means for attaching a rake handle to said rake support member; and wherein said at least one upper leg tine segment and said at least one lower leg tine segment are of different lengths.

2. A rake head described in claim 1 wherein the number of legs terminating with leg ends for each stem is two.

3. A rake head described in claim 1 wherein the means for attaching said plurality of legs terminating with leg ends to form said plurality of tine stems is by the binding of said tine stems to said leg is with a ferrule.

4. A rake head described in claim 1 wherein the means for attaching said plurality of legs terminating with leg ends to form said plurality of tine stems is by fusing said plurality of legs together with heat.

5. A rake head described in claim 1 wherein the means for attaching said plurality of legs terminating with leg ends to form said plurality of tine stems is by welding said plurality of legs together.

6. A rake head described in claim 1 wherein said means for attaching said plurality of legs terminating with leg ends to form said plurality of tine stems is by gluing said plurality of legs together.

7. A rake head described in claim 1 wherein said means for attaching said plurality of tine stems to said rake support member is by inserting said tine stems into said crimpable loop integrated into said rake head.

8. A rake head described in claim 1 wherein said means for attaching said plurality of tine stems to said rake support member is by welding said tine stems to said rake support.

9. A rake head described in claim 1 wherein said means for attaching said plurality of tine stems to said rake support member is by fusing said tine stems to said rake support.

10. A rake head described in claim 1 wherein said rake head is formed as a single unit in a mold.

11. A rake head described in claim 1 wherein said rake support member holds said plurality of tine stems at an angle along the slightly curved surface of said rake head.

* * * * *